United States Patent [19]

Kirkpatrick

[11] Patent Number: 5,676,387
[45] Date of Patent: Oct. 14, 1997

[54] APPARATUS FOR TRANSPORTING GARMENT BAGS

[76] Inventor: Patricia L. Kirkpatrick, 8715 Oshge Dr., Tampa, Fla. 33634

[21] Appl. No.: 311,748
[22] Filed: Sep. 23, 1994
[51] Int. Cl.⁶ .................................................. B62B 1/12
[52] U.S. Cl. .................. 280/37; 190/18 A; 280/655; 280/47.26
[58] Field of Search .................. 190/18 A; 280/37, 280/641, 655, 79.3, 47.371, 645, 47.26, 654; 248/98

[56] References Cited

U.S. PATENT DOCUMENTS

| | | | |
|---|---|---|---|
| 1,169,157 | 1/1916 | Honold | 280/79.3 X |
| 4,284,287 | 8/1981 | Esposito | 280/655 |
| 4,618,035 | 10/1986 | Mao | 280/655 X |
| 5,024,455 | 6/1991 | Schrecongost | 190/18 A |
| 5,209,327 | 5/1993 | Wright et al. | 190/18 A |
| 5,242,189 | 9/1993 | Osaki | 280/645 |
| 5,330,141 | 7/1994 | Kim | 280/641 X |
| 5,353,900 | 10/1994 | Stilley | 190/18 A |

Primary Examiner—Richard M. Camby
Assistant Examiner—Michael Mar

[57] ABSTRACT

An apparatus for transporting garment bags comprising a frame in a rectangular configuration which has a lower member and an upper member. Each portion has parallel vertical legs and a horizontal leg therebetween. Also included are a pair of longitudinally aligned wheels with offset, normally parallel axes and which extend downwardly from the lowermost surface of the lower portion. One of the wheels is adapted to rotate 360 degrees about a vertical axis. Each wheel includes a horizontal shaft for allowing the wheels to rotate freely about a horizontal axis.

8 Claims, 8 Drawing Sheets

APPARATUS FOR TRANSPORTING GARMENT BAGS

BACKGROUND OF THE INVENTION

1. Field of the Invention

This invention relates to apparatus for transporting garment bags and, more particularly, to transporting garment bags on a carrier device having a frame and a pair of longitudinally aligned wheels.

2. Description of the Background Art

Presently, there are a wide variety of wheeled devices used to facilitate the movement of luggage while moving it to, from and through airports and the like. Such devices may take the form of components built into the luggage. Other such devices may take the form where the luggage is removably coupled to the wheels. Of the later type, most of such devices are for supporting rigid or semi-rigid suit cases. There is nothing in the prior art to assist people, particularly travelers, by facilitating the convenient transportation of flexible foldable garment bags.

As evidenced by a large number of prior art patents, efforts are continuing to improve transportation of luggage. Garment bags with wheels attached, for example are shown in, U.S. Pat. No. 5,253,739 to King which discloses a wheeled flight bag with retractable pull handle; U.S. Pat. No. 5,230,408 to Sadow which discloses an automatically extending anti tip-over device for wheeled luggage; U.S. Pat. No. 5,209,328 to Kotkins which discloses a roller-supported traveling luggage; and U.S. Pat. No. 5,209,327 to Wright which discloses a wheeled article of luggage.

Consider also patents directed to wheeled frames for hanging garment bags whether conventional or modified. Note U.S. Pat. No. 5,197,578 to Van Hooreweder which discloses luggage with four rolling elements; U.S. Pat. No. 5,167,306 to Carrigan which discloses luggage with cart apparatus; and U.S. Pat. No. 5,163,539 to Yang which discloses a luggage roller.

Luggage with wheels attached are disclosed in U.S. Pat. No. 5,154,265 to Capistrant which discloses a retractable wheel assembly; U.S. Pat. No. 5,116,289 to Pond which discloses a carry-on case having wheels and an extendable handle; U.S. Pat. No. 5,113,982 to Pulichino which discloses a garment bag with wheels and an inner panel with plural access openings; U.S. Pat. No. 5,111,918 to Bako which discloses a rollable suitcase; U.S. Pat. No. 5,109,961 to Bergman which discloses a suitcase having wheels and flexible body construction; U.S. Pat. No. 5,108,119 to Huang which discloses a wheeled carrying case; U.S. Pat. No. 5,105,920 to Grebenstein which discloses a zipped suitcase with wheels supported by peripheral frame sections; and U.S. Pat. No. 5,105,919 to Bornes which discloses a duffle bag with wheels disposed in an end wall.

Luggage with more than two wheels attached are U.S. Pat. No. 5,024,455 to Schrecongost which discloses a luggage cart; U.S. Pat. No. 4,998,603 to Nordstrom which discloses a garment bag with wheels and a detachable valet case; and U.S. Pat. No. 4,995,487 to Plath which discloses a wheeled suitcase and luggage support; U.S. Pat. No. 4,813,520 to Lin which discloses an externally and detachably framed collapsible baggage; U.S. Pat. No. 4,618,035 to Mao which discloses a collapsible and movable support for wardrobe; and U.S. Pat. No. 4,538,709 to Williams which discloses a wheeled garment bag.

Luggage with two wheels attached for a cart-like construction include U.S. Pat. Nos. 4,406,353 and 4,411,344 to Walker which disclose supports for garment bags with side by side non-caster wheels adapted to be pulled behind a user; U.S. Pat. No. 4,383,141 to Walker which discloses a carrier for garment bags and the like; U.S. Pat. No. 4,122,924 to Wasserman which discloses wheel supported luggage; U.S. Pat. No. 4,062,429 to Tabor which discloses a combined garment bag and carrier; and U.S. Pat. No. 2,757,935 to Sofia which discloses a collapsible shopping cart.

Lastly, various wheel arrangements are disclosed in U.S. Pat. No. 2,313,884 to Mattoon which discloses a collapsible package carrier and British Patent Number 1,099,200 which discloses a hand luggage of a large capacity adapted to be transformed into a go-cart.

As will become evident, nothing in the prior art provides the benefits and advantages attendant with the present invention wherein garment bags may be folded in half in the normal fashion and the movement thereof facilitated by longitudinally aligned wheels on a support structure specifically designed for garment bags.

Accordingly, it is an object of this invention to provide an improvement which overcomes the aforementioned inadequacies of the prior art devices and provides an improvement which is a significant contribution to the advancement of the art.

Another object of this invention is to transport garment bags more easily through a system including a support structure with wheels.

Another object of this invention is to support a garment bag so that it may be more easily handled during transportation wherein the device may be more readily stored or otherwise accommodated when not being support and transported.

Another object of this invention is to provide an apparatus for transporting garment bags comprising a frame in a rectangular configuration which has a lower member and an upper member. Each portion has parallel vertical legs and a horizontal leg therebetween. Also included are a pair of longitudinally aligned wheels with offset, normally parallel axes and which extend downwardly from the lowermost surface of the lower portion. One of the wheels is adapted to rotate 360 degrees about a vertical axis. Each wheel includes a horizontal shaft for allowing the wheels to rotate freely about a horizontal axis.

The foregoing has outlined some of the pertinent objects of the invention. These objects should be construed to merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises a new and improved apparatus for transporting garment bags comprising, in combination, a frame in a rectangular configuration having a lower U-shaped member and an upper inverted U-shaped member. each U-shaped member has parallel vertical legs and a horizontal leg therebetween. The horizontal leg of the lower member is a vertically oriented plate. The vertical legs of the lower member are of an increased diameter with respect to the vertical legs of the upper member for the slidable receipt thereof. The locking components include a radial aperture in the lower member and a plurality of vertically aligned radial apertures in the upper member with an associated button extending through the aperture of the lower member and a preselected one of the apertures of the upper member. The locking component also includes a leaf spring in a V-shaped configuration having one upper end coupled with respect to an interior surface of the lower member and the other end coupled with respect to the button tending to urge the button outwardly through aligned apertures of the upper and lower members. The button is adapted to be depressed by a user to a location interior of the upper member to allow axial sliding between the upper and the lower members. Further provided are a pair of longitudinally aligned wheels with offset, normally parallel axes and extending downwardly from the lowermost surface of the lower member. One of the wheels is adapted to rotate 360 degrees about a vertical axis. Each wheel includes a fender with an aligned horizontal aperture and a shaft positioned to the aperture for allowing the wheels to rotate freely about a horizontal axis.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several Figures.

DETAILED DESCRIPTION OF THE PREFERRED EMBODIMENT

With reference now to the drawings, and in particular to FIG. 1 through 17 thereof, a new and improved apparatus for transporting garment bags embodying the principles and concepts of the present invention, and generally designated by the reference numeral 10, will be described.

The present invention, the new and improved apparatus for transporting garment bags, is comprised of a plurality of components. Such components in their broadest context include a frame, locking components and wheels. Such components are individually configured and correlated with respect to each other so as to attain the desired objective.

Figure 1:
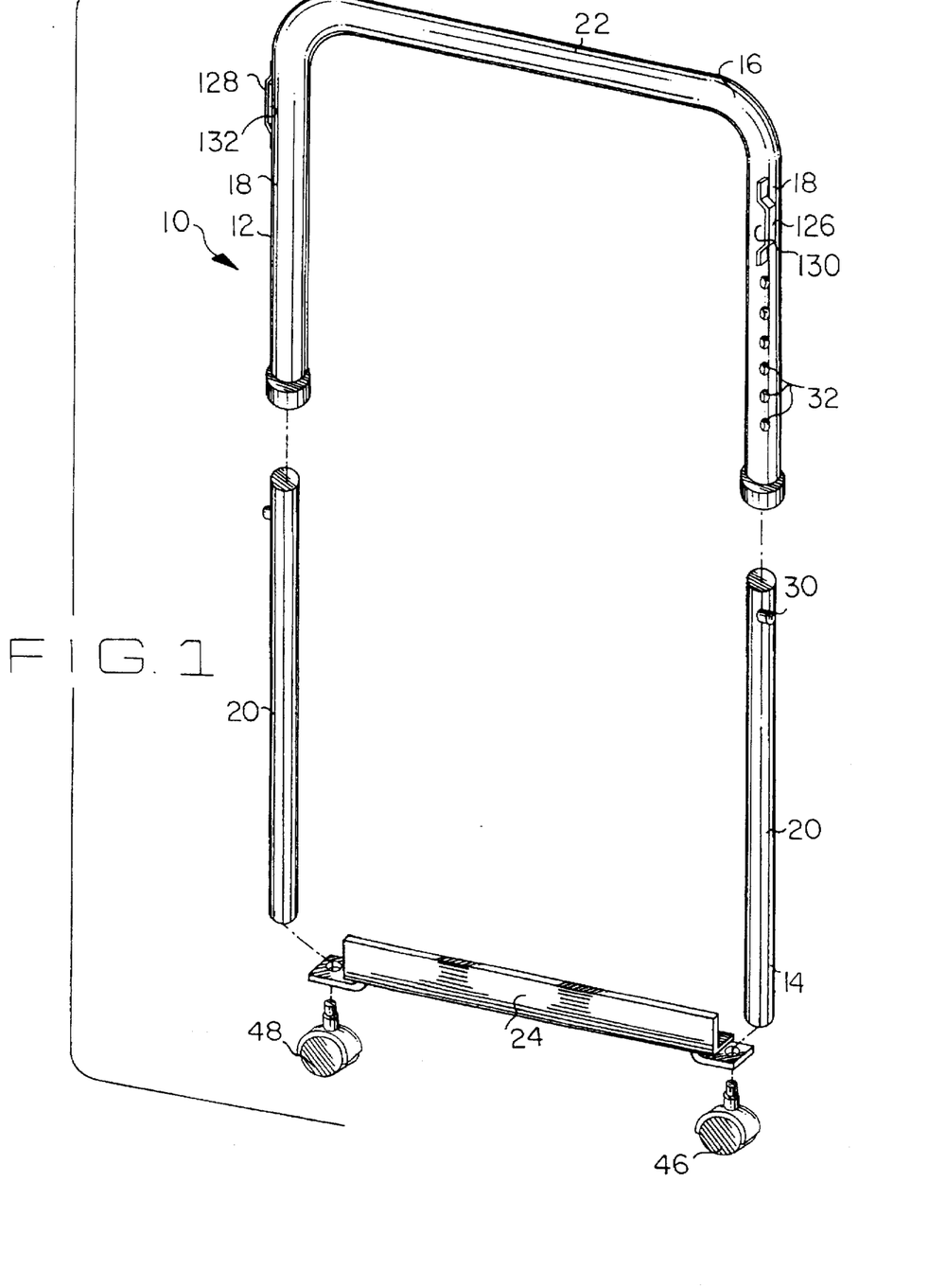
FIG. 1 is an exploded perspective view of the preferred embodiment of the apparatus for transporting garment bags constructed in accordance with the principles of the present invention.

The central component of the system 10 is a frame 12. Such frame is in a rectangular configuration. It has a lower U-shaped member 14 and an upper inverted U-shaped member 16. Each U-shaped member has parallel vertical legs 18, 20 and a horizontal leg 22, 24 therebetween. The horizontal leg 24 of the lower member is a vertically oriented plate for increased rigidity and to preclude allowing a garment bag thereover from extending outwardly to an excess degree. The vertical legs of the lower member are of an decreased diameter with respect to the vertical legs of the upper member. This allows for the slidable receipt of the legs of the upper member over the vertical legs of the lower member.

The next major component of the system 10 are the locking components 28. Such locking components include a radial aperture 30 in each of the lower members. In association therewith are a plurality of vertically aligned radial apertures 32 in the upper member. In association therewith is a button 34 extending through the aperture of the lower member and a preselected one of the apertures of the upper member. The locking components also include, for each side, a leaf-spring 36 in a V-shaped configuration. Such spring has one upper end 38 coupled with respect to an interior surface 40 of the lower member. The other end 42 of the V-shaped member is coupled with respect to the button and tends to resiliently urge the button outwardly through the aligned apertures of the upper and lower members. The button is adapted to be depressed by a user to a location interior of the upper member. This allows for the axial sliding movement between the upper and lower members.

Lastly provided as a principle component of the system 10 are a pair of longitudinally aligned wheels 46, 48. The wheels have offset axes which are normally parallel with respect to each other when the device is moved in a linear path of movement. The axes may become skewed when the device is moved in a curved path of travel around a corner.

Figures 2, 3, 4:
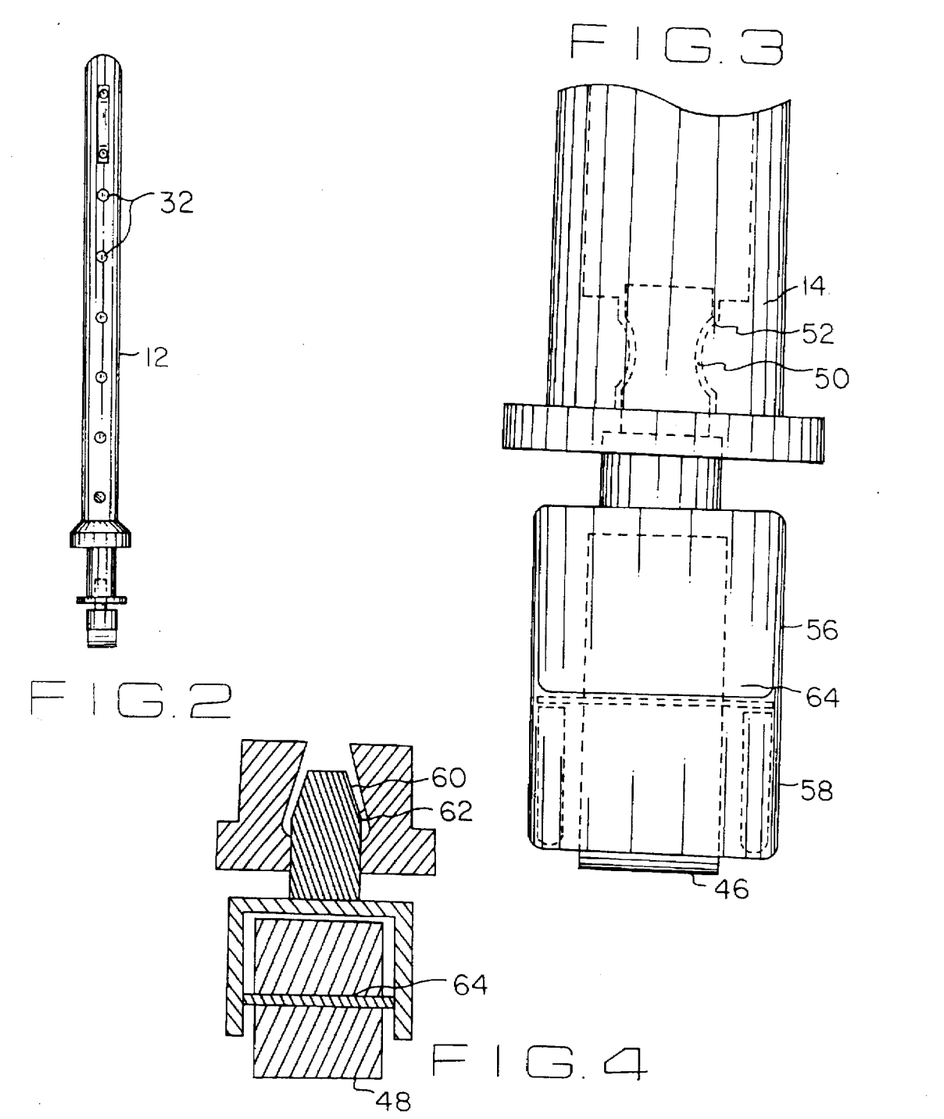
FIG. 2 is a side elevational view of the apparatus shown in FIG. 1.
FIG. 3 is an enlarged end elevational view of one of the wheels of the apparatus shown in FIG. 1 and 2.
FIG. 4 is a cross sectional view of another of the wheels shown in FIGS. 1 and 2.

The wheels extend downwardly from the lowermost surface of the lower member. One of the wheels is adapted to rotate 360 degrees about a vertical axis. Note FIG. 3. This is effected through a supporting structure having a recessed portion 50 received in a pair of resilient surfaces 52 curved to receive the recesses 54. Also included in association with each wheel is a fender 56. The fender has downwardly extending components 58 adapted to support a shaft in a horizontal orientation. The shaft supports a horizontal aperture in each wheel. This allows the wheel to rotate freely about a horizontal axis. The other wheel is of a similar construction. It, however, is not adapted for rotation about a vertical axis. Instead, the upwardly extending support 60 is of a cone-shaped configuration for being wedged into a similar cone-shaped recess 62 at the lower surface of the lower member. In this regard, it should be understood that in the preferred embodiment, one wheel is in essence a caster for rotation about a horizontal axis 64 for movement and about a vertical axis for changing direction. The other wheel is not a caster and is adapted merely for rotation about a horizontal axis 64 during movement. It is a matter of choice by the user as to whether the caster is located forwardly or rearwardly when moving a garment bag supported thereon. In the alternative, both wheels may be in the form of casters for rotation about vertical axes. Again, such is a matter of choice and design as a function of the preference of a user.

Next provided are a plurality of flanges 126 and 128. Such flanges are secured to the vertical legs of the upper member at an upper extent thereof, adjacent to the elevational midpoint of the device. A flange may also be provided at the central extent of the lower surface of the horizontal leg. Such flange would extend downwardly at the central extent thereof. The flanges are of a rigid material with apertures 130 and 132 therethrough. The apertures of the vertical legs are for receiving an elastic luggage strap, a type of bungee cord. Such strap extends therethrough and around a folded garment bag for the releasable securement of the garment bag to the frame. The garment bag is supported on the frame through the upper horizontal member with the handle of the garment bag extending upwardly for being held during transportation.

The central component of the system 10 of the next embodiment is a frame 64. In the alternate embodiment, as illustrated in FIGS. 5 through 10, the frame is in a rectangular configuration. It has a lower U-shaped member 66 and a upper inverted U-shaped member 68. Each U-shaped member is formed with parallel vertical legs 70 and 72 and horizontal legs 74 and 76 therebetween. In addition, bends 78 and 80 are at the junction of the horizontal and vertical legs. The legs of the lower member are of an increased diameter with respect to the legs of the upper member. This is for effecting a sliding receipt of the upper vertical legs into the lower vertical legs for adjustment purposes as will be later described.

The next components of the system 10 are the locking components 84. Such locking components include, for each side, an interiorly facing radial aperture in the upper member. In association therewith are a plurality of interiorly facing vertically aligned apertures 88 in the lower member. An associated button 90 extends through the aperture of the upper member and a preselected one of the apertures of the lower member during operation and use.

The locking components also include a leaf-spring. Such leaf-spring is formed in a V-shaped configuration. Note FIG. 7. The configured spring has one upper end secured to an interior surface of the upper member. The other end of the V-shaped leaf-spring is secured to the button in such manner that the leaf-spring with the bend of its V tends to urge the button outwardly through the aligned apertures of the upper and lower members. The button is adapted to be depressed by a user to a location interior of the aperture of the lower member. In this orientation the upper member may slide axially with respect to the lower member to vary the height and general size thereof.

It is preferred that a similar button and leaf-spring arrangement with associated holes be on each side of the device for greater stability. The use of such button and locking components with the plurality of apertures is to allow the raising and lowering of the upper horizontal leg with respect to the lower horizontal leg in order to accommodate garment bags of any of a plurality of sizes. The locking components are essentially the same as in the primary embodiment of the prior Figures.

Next provided are a pair of axially aligned casters 110. Such casters extend downwardly from the lower most surface 112 of the lower U-shaped member at points of its horizontal member remote from its adjacent bends. Each caster is adapted to rotate 360 degrees about a support pin 114 secured to the lower horizontal member about a vertical axis. The caster preferably includes a fender 116 on its upper extent. The caster has aligned horizontal apertures 118 on opposite sides thereof. The casters also include a ball 120 on a shaft 122. The shaft is secured to the apertures and is adapted to rotate 360 degrees about a horizontal axis through the center of the horizontal shaft.

Figure 11:
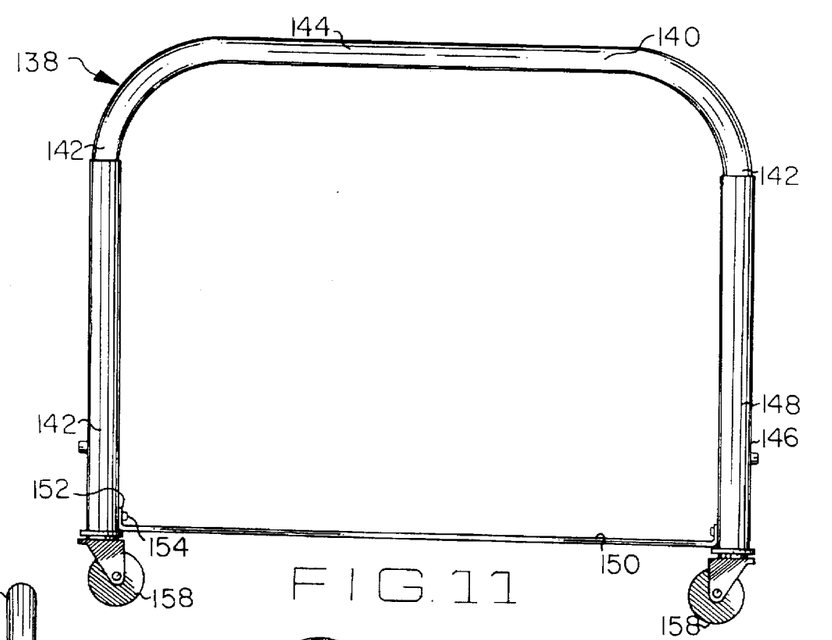
FIG. 11 is an illustration of another alternate embodiment of the invention.
Figure 12:
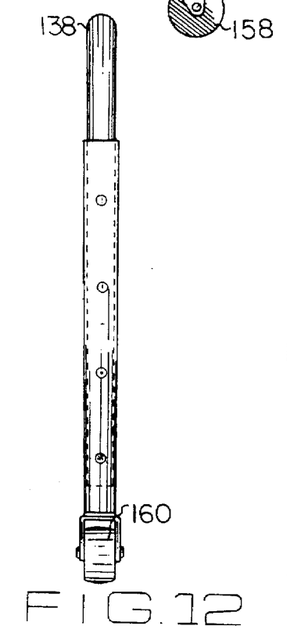
FIG. 12 is a side elevational view of the device shown in FIG. 11.
Figure 13:
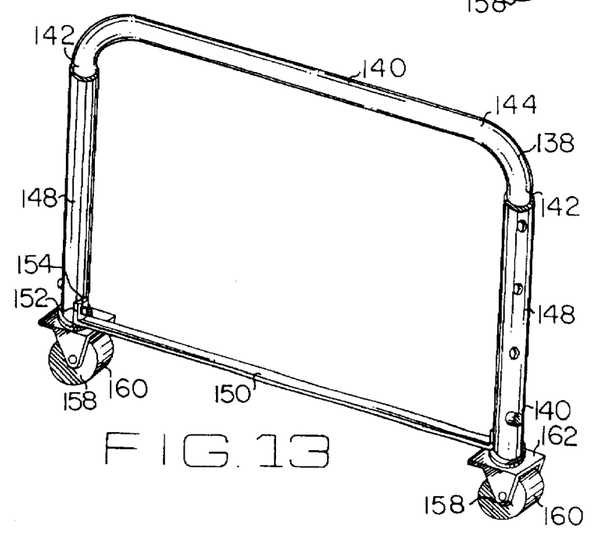
FIG. 13 is a perspective illustration of the device shown in FIGS. 11 and 12.

The next alternate embodiment of the invention is shown in FIGS. 11, 12 and 13. In such embodiment, the device includes a frame 138. The frame has an upper inverted U-shaped member 140 with parallel vertical legs 142. A horizontal leg 144 couples the vertical legs thereabove. The second component of the frame 146 is a lower U-shaped member 80 with parallel vertical legs 148. Coupling of such legs is through a rigid strap 150. The strap is preferably metallic or a rigid plastic with upturned ends 152 and pins 154 coupling the legs thereto for constituting an entirely rigid frame.

In such embodiment, the casters 158 are formed as wheels 160 rather than balls as disclosed in the prior embodiment. Brackets 162 allow coupling of the wheels to the frame through vertical pins for rotation of the wheels about vertical axes.

Figure 14:
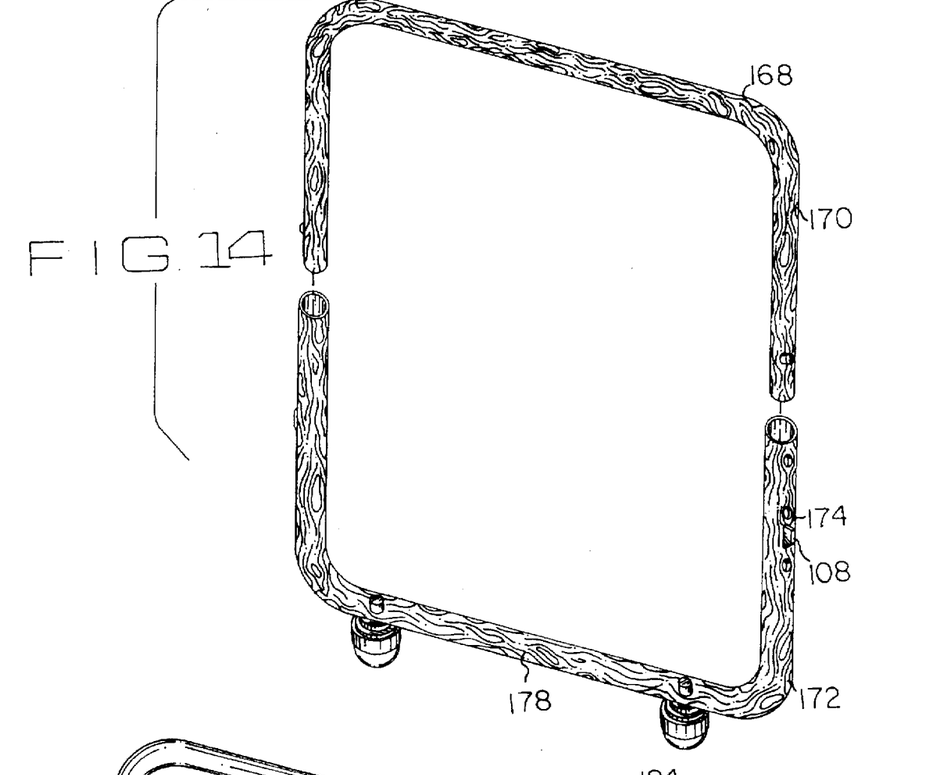
FIG. 14 is a perspective illustration of an additional alternate embodiment of the invention.

The next alternate embodiment is shown in FIG. 14. The frame 168 of this embodiment is formed of the two U-shaped frame components 170 and 172 as in the primary embodiment. The exterior surfaces of such components is shown in a different decorative configuration, preferably a multi-color camouflage. In addition, lateral flanges 108 are formed on the exterior surface of the vertical legs of the lower U-shaped member. Such flanges are rigid. Each features an aperture 174. In this manner, when a garment bag is placed over the device for being transported with its handle extending upwardly, a resilient luggage strap cord may be positioned through such apertures 174 to ensure that the folded garment bag is retained in position on the frame. In addition, it is preferred to utilize an additional flange 178 extending downwardly from the bottom central region of the lower U-shaped member 172. An alternate or an additional horizontal strap may be utilized therethrough and oriented to extend around the top of the frame and its supported garment bag. Other types of tie-down components of elastic or inelastic material, for example straps with buckles, could readily be utilized for such tie-down function.

Figure 15:
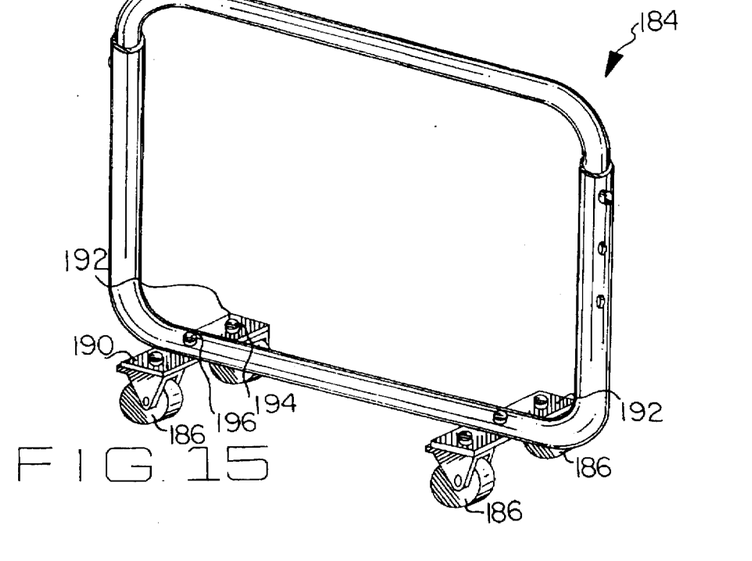
FIG. 15 is a perspective view of another alternate embodiment of the invention.

A modified frame 184 is shown in the embodiment of FIG. 15. Such frame is essentially identical with that shown in the embodiment of FIGS. 6 through 10. In such FIG. 15 embodiment, the two casters depending downwardly from the lower most surface of the U-shaped frame are replaced with four casters 186 coupled to the frame 188. Such casters are shown as wheels as in the embodiment of FIGS. 11 through 13. Wheels of any other type could readily be utilized. The wheels 190 are supported to depend downwardly from a pair of horizontal plates 192. Adjacent to the ends of the plates are vertically extending pins 194 adapted to support the casters for rotation about vertical axes. In addition, the central extent of each plate is pivotably coupled through a central vertical support rod 196 about which the plates may rotate. In this manner, the casters may be rotated to form a four-wheeled base as shown in FIG. 15. In such configuration, the frame and garment bag would be self-supporting. The plates may, however, be turned ninety degrees so that the wheels are in linear longitudinal alignment with each other as well as the frame.

Figure 16:
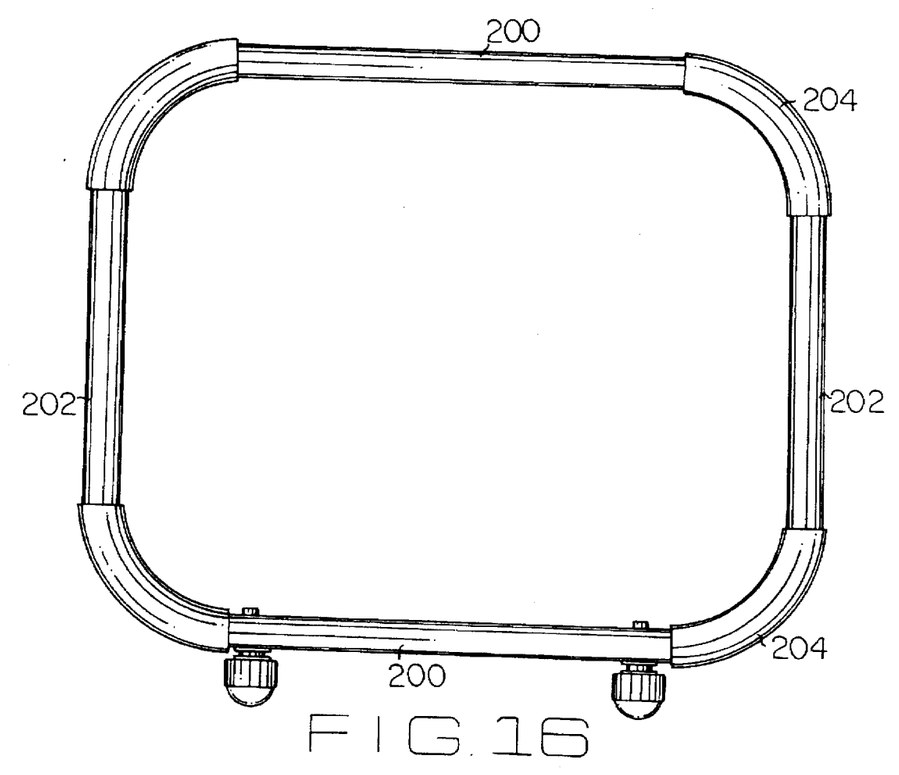
FIG. 16 is a front elevational view of yet another alternate embodiment of the invention.

The next alternate embodiment is shown in FIG. 16. Such embodiment differs from all the prior embodiments in that it is not provided with adjustability. The prior embodiments are preferably fabricated of a lightweight rigid material as for example, aluminum or rigid plastic. The FIG. 12 embodiment is an economical version thereof without adjustment and fabricated of a rigid plastic material such as polyvinyl chloride (PVC). Such frame includes four linear segments, two long horizontal segments 200 and two short vertical segments 202. Ninety degree elbows 204 are coupled between the segments.

Figure 17:
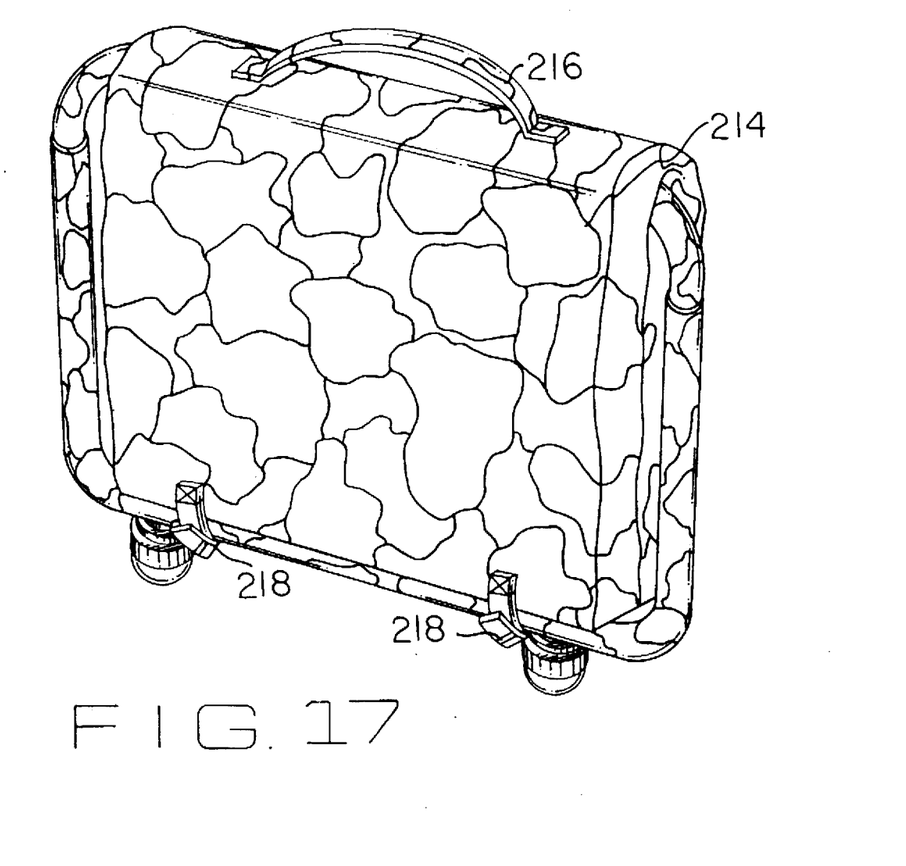
FIG. 17 is a perspective view of yet another alternate embodiment of the invention with the frame supporting a garment bag.

The last embodiment is shown in FIG. 17. In this embodiment, the frame 208 is formed non-adjustable. It is simply of a one piece member in a looped configuration with parallel horizontal upper and lower members and parallel vertical side members therebetween. In such embodiment, the device may be specifically configured and designed in appearance for use with a mating specific garment bag of a particular construction and exterior design.

Figure 5:
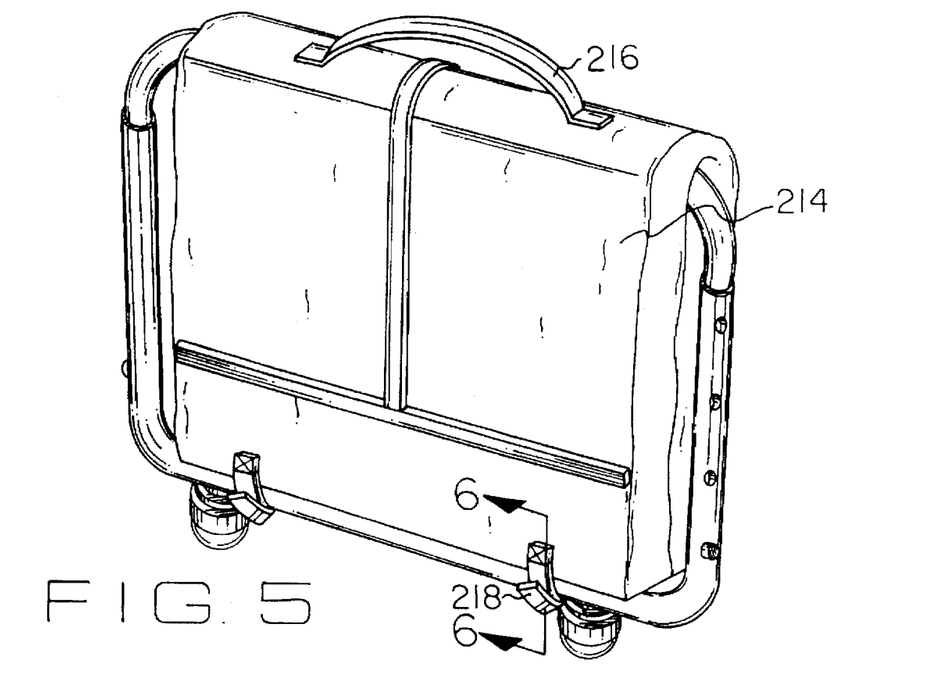
FIG. 5 is a perspective illustration of an alternate embodiment of the apparatus for transporting garment bags constructed in accordance with the principles of the present invention.
Figure 6:
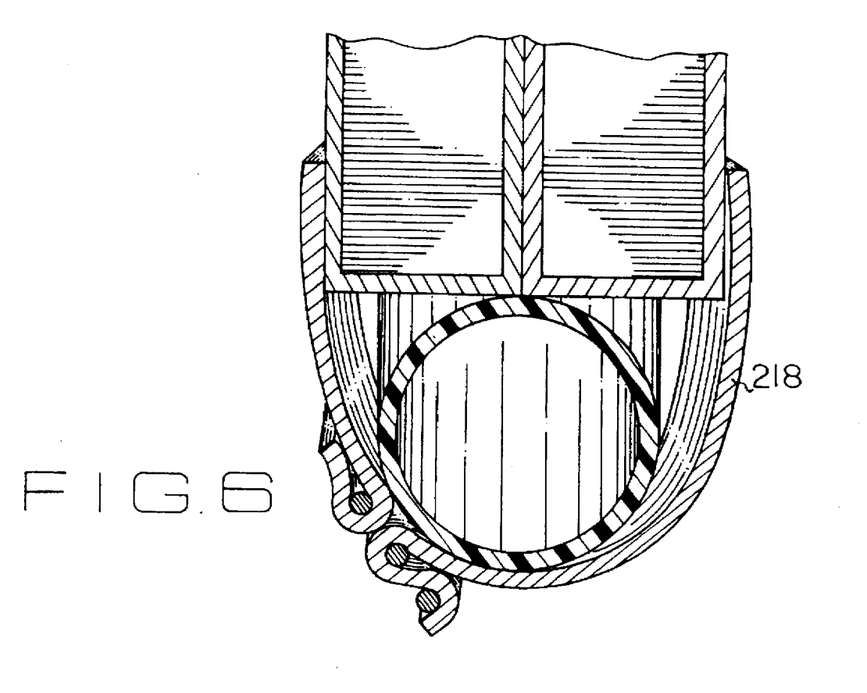
FIG. 6 is a cross sectional view taken along line 6—6 of FIG. 5.
Figure 7:
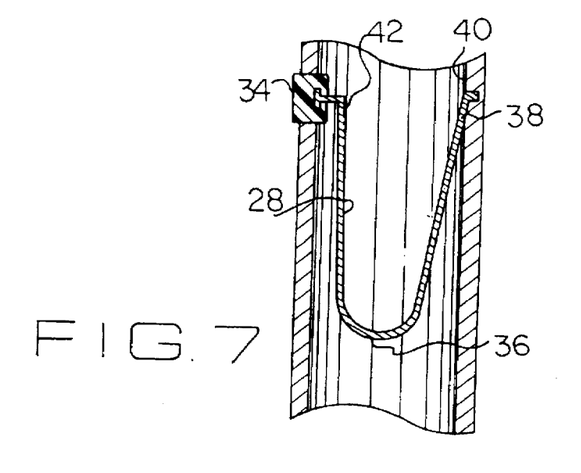
FIG. 7 is a cross sectional view taken along line 7—7 of FIG. 6.
Figure 8:
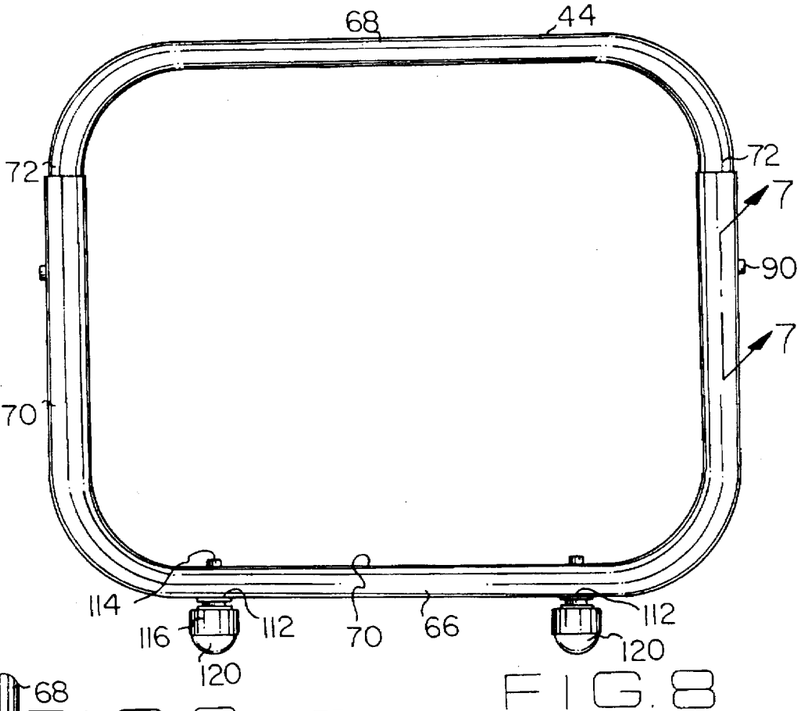
FIG. 8 is a front elevational view of the device shown in FIGS. 5, 6 and 7.
Figures 9, 10:
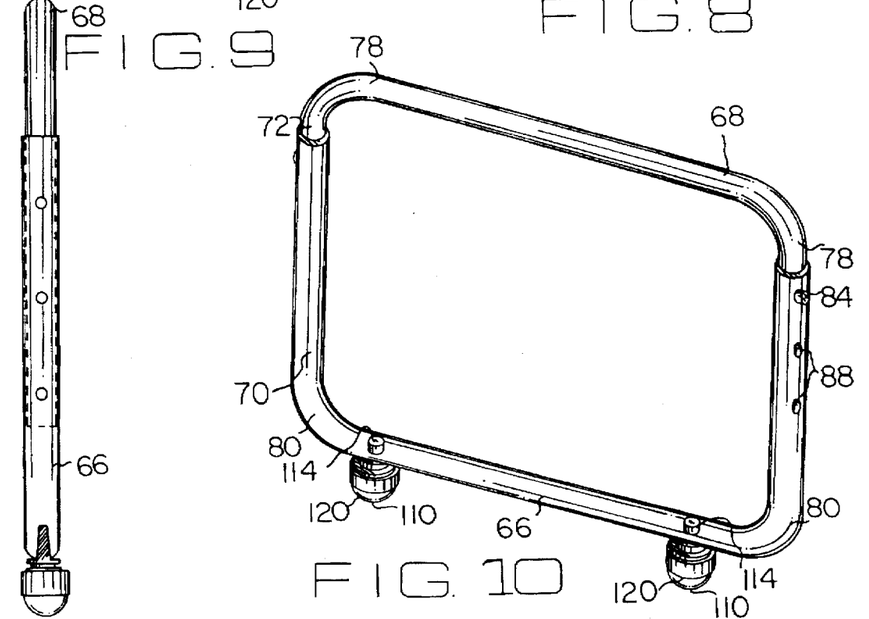
FIG. 9 is a side elevational view of the device shown in FIGS. 5 through 8.
FIG. 10 is a perspective view similar to FIG. 5 but with the garment bag removed.

The draping of the garment bag 212 over a frame can be seen in FIGS. 5 and 17. In such Figures, the garment bag 214 is folded approximately mid-point so as to expose a central handle 216 thereabove. Such handle may be utilized for pulling the garment bag when located on any of the frames of the prior embodiments. Such garment bags include free ends with buckles 218 for coupling together the free ends when mounted on a frame.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,
What is claimed is:

1. A system for transporting garments comprising:

a garment bag in a generally rectangular configuration with an interior face and an exterior face and a periphery formed of long parallel side edges and short horizontal top and bottom edges therebetween and with a fold line between the top and the bottom edges and parallel therewith, the garment bag having a first coupling component secured with respect to the top edge and a second coupling component secured with respect to the bottom edge;

a frame in a rectangular configuration having a lower U-shaped member and an upper inverted U-shaped member, each U-shaped member having parallel vertical legs and a horizontal leg therebetween, the vertical legs of the upper member being telescopically received within the vertical legs of the lower member, the fold line being positioned over the horizontal leg of the upper member and the top and bottom edges being positioned in contact with each other adjacent to the horizontal leg of the lower member and with at least one of the first and second coupling components extending beneath the horizontal leg of the lower member when the first and second coupling components are coupled together for securing the garment bag to the frame; and a pair of longitudinally aligned wheels attached to the horizontal leg of the lower member and extending downwardly therefrom, at least one of the wheels adapted to rotate 360 degrees about a vertical axis, each wheel including a horizontal shaft for allowing the wheels to rotate freely about a horizontal axis.

2. The system as set forth in claim 1 and further including locking components coupling the upper and the lower members to permit adjustment of the height of the frame.

3. The system as set forth in claim 1 and further including a plurality of flanges secured to the vertical legs of the upper member and to the horizontal leg of the lower member extending downwardly at a central extent thereof, the flanges being rigid with apertures therethrough for the receipt of a cord therethrough for the releasable securement of a garment bag to the frame.

4. The system as set forth in claim 1 wherein the exterior surface of the frame is of a common appearance throughout.

5. The system as set forth in claim 1 wherein the exterior surface of the frame is of plural colors in a camouflage design.

6. The system as set forth in claim 1 and further including two horizontal plates pivotally secured at their central extents to a lower surface of the lower member with castors depending downwardly from the opposite ends thereof.

7. The system as set forth in claim 1 wherein the frame is fabricated of aluminum.

8. The system as set forth in claim 1 wherein the frame is fabricated of polyvinyl chloride.

* * * * *